United States Patent [19]

Ward

[11] 4,250,601
[45] Feb. 17, 1981

[54] PLASTIC SHEET SUPPORT CLIP

[76] Inventor: Stanley R. Ward, 2356 Brentnell, Columbus, Ohio 43211

[21] Appl. No.: 55,057

[22] Filed: Jul. 5, 1979

[51] Int. Cl.³ .............................................. A44B 21/00
[52] U.S. Cl. ......................................... 24/264; 24/130;
105/377; 211/89; 160/368 R; 225/91;
248/225.1; 248/300; 296/95 R
[58] Field of Search ....................... 24/264, 130, 81 F;
248/225.1, 300; 225/91, 83; 211/89; 160/368 R;
105/377; 296/95 R

[56] References Cited

U.S. PATENT DOCUMENTS

| 887,558 | 5/1908 | Werner | 248/300 |
|---|---|---|---|
| 1,169,650 | 1/1916 | Kendall | 24/130 |
| 2,233,725 | 3/1941 | Begin et al. | 248/300 |
| 2,656,043 | 10/1953 | Wold | 24/89 |
| 2,928,270 | 3/1960 | Olson | 24/264 |

Primary Examiner—Alexander Grosz
Attorney, Agent, or Firm—Robert E. Stebens

[57] ABSTRACT

A plastic sheet support clip is provided for use in conjunction with a plastic sheet which performs the function of a protective seal to inhibit the passage of water into the cargo compartment of trucks having a door that is not adequate for water protection. This plastic sheet support clip is formed from a single thin piece of sheet metal. When the metal is stamped the invention is formed comprising a channel form retainer open at the top and a mounting flange having holes to assist in securing the invention to the side walls of the truck. The retainer has a bottom, a front wall and two side walls. A V-shaped notch is formed in the front wall and opening at the upper edge of the front wall. Lower portions of the notch are sharpened and act as a plastic sheet tearer or cutter.

8 Claims, 5 Drawing Figures

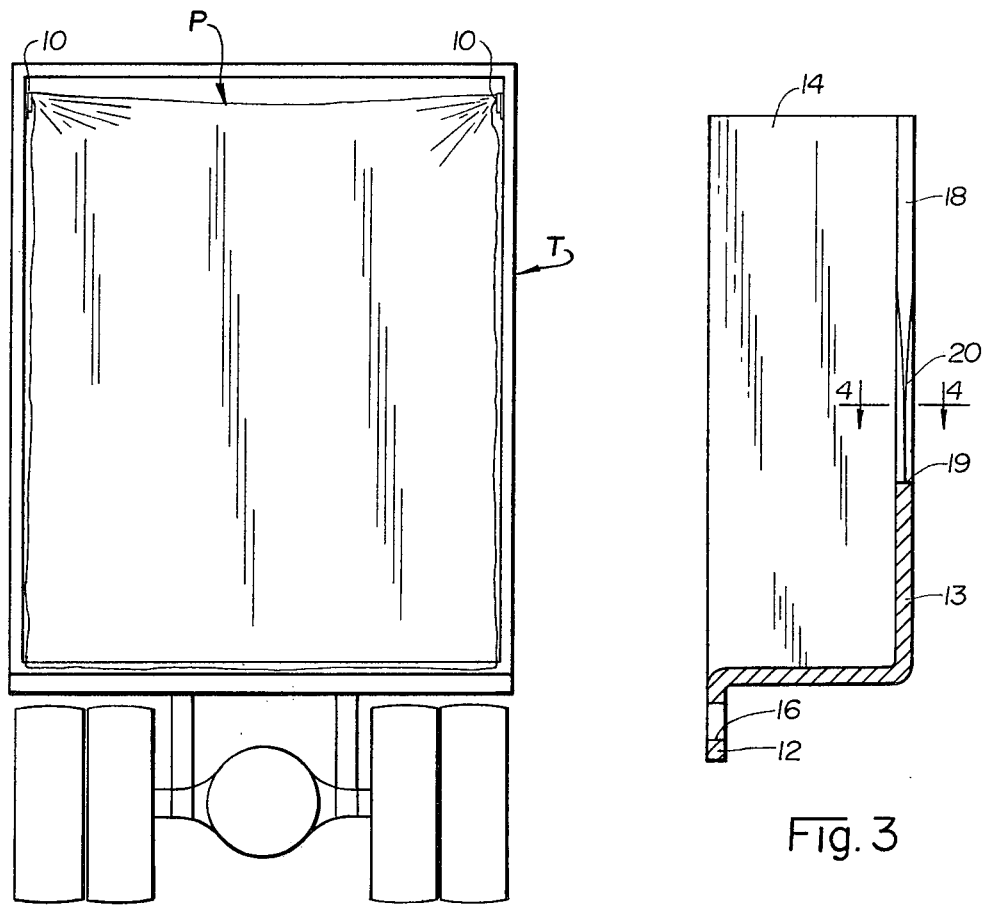
Fig. 3
Fig. 5
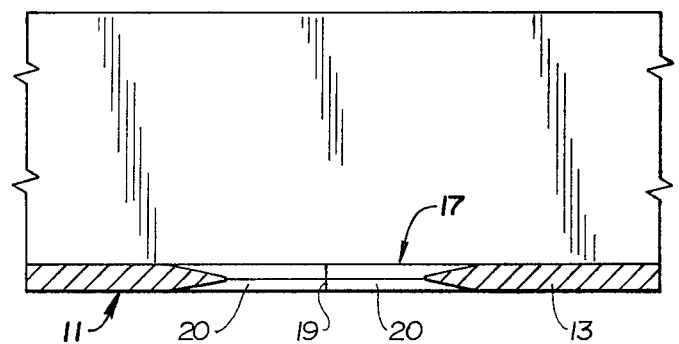
Fig. 4

PLASTIC SHEET SUPPORT CLIP

BACKGROUND OF THE INVENTION

This invention is directed to the providing of a suitable plastic sheet support clip structure which is designed to be utilized in combination with a plastic sheet in effectuating a water impervious seal at the rearward end of a truck having a closable door assembly. This plastic sheet and support clip structure does not form the basic protective shielding as to a door opening but is only intended as a supplementary structure for increasing the ease with which the seal can be effectuated and decreasing the time, cost and wasted materials associated with the current methods of coping with this situation. The invention allows an effective seal to be formed and thus aids in preventing the entry of water into the cargo compartment of the truck.

Cargo trucks having a rear door assembly must guard against the seepage of water into the cargo area. Although trucks with dual hinged door assemblies are better able to seal tightly because of overlap around their edges, such as many refrigeration trucks and tractor-trailer trucks also provide with sealing gaskets, those trucks provided with such door assemblies as well as those with roll-down doors permit water to seep in from the sides and bottom of the door. The custom is for truckers to attach an inexpensive sheet of plastics, whose width extends across the width of the cargo area, to the top of the sides of the truck body adjacent to the rear door. The plastic sheet extends from the top of the truck to just beyond the point that the rear door latches. After the sheet is fastened to the side walls of the cargo compartment the rear door is closed and the lower edge of the plastic sheet is pulled between the bottom of the door and the floor of the truck itself. The door is then closed and the latch is fastened. The plastic sheet then effectively prevents the entrance of water and consequent damage to the cargo.

The attachment of the sheet to the upper side walls has been accomplished by a variety of means, all of which possess limitations. One often used method relies on stapling of the sheet to a wooden inner frame structure of the truck or van body. If the particular truck does not have the wood frame or wall into which the staples may be driven, any attempt to make the staple fasten to metal is an exercise in futility. If the truck does have a wood frame then several staples must be used to securely support the weight of the sheet. Over a period of time literally thousands of staples must be used. Additionally there is the cost of staplers or stapling guns which can be lost or stolen.

Another method of attachment relies on the use of adhesive tapes, such as masking tape. When the side walls of the truck are made of metal, tape has been the only method that was practical. Copious strips of tape are applied to the upper corners of the sheet in an attempt to enable the tape to support the sheet. The amount of tape necessary for the proper degree of adhesion varies with the type and brand of tape used, and also with the weather conditions. Low temperature decreases the ability of the tape to stick effectively. Also, dampness and moisture adversely affects the adhesion of the tape. Therefore, in addition to being costly, the general effectivity and dependability of tape is not very good.

In addition to the two above methods there is one method relied upon by truckers when all else has seemingly failed. Sometimes truckers puncture holes in the wood side walls and attempt to secure the corners of the plastic sheet in these holes and support the sheet in this fashion. Needless to say, this method exposes the trucker to the potential of physical harm because of the wood splinters or slivers through which he must continue to fasten subsequent plastic sheets. Also, this adversely affects the value of the trailer or truck.

Therefore the above methods for attaching the plastic sheet result in excess cost, possible health dangers, frequently ineffective seals and consequently damage to cargo, and considerable labor, and time in first locating the fastening materials and then in securely fastening the sheet to the van body.

SUMMARY OF THE INVENTION

In accordance with this invention, a plastic sheet support clip is provided for advantageous use as means of attachment for a sheet of plastic which serves to provide an effective water resistant seal for use in the cargo compartment of trucks having a rear assembly door. The plastic sheet support clip structure of this invention is formed from a single piece of stamped sheet metal. In accordance with this invention the clip is formed having an attachment plate and a plastic sheet retainer. The attachment plate has several holes through which appropriate fastening devices may be projected to secure the clip to the body of the truck. The retainer is comprised of a bottom, two side walls and a front wall. The side wall of the truck serves as the rear wall of the container. A triangular notch is formed in the top of the front wall of the retainer with sides of the notch converging to a point downwardly from the open top. The lower inside edge portions of this notch are sharpened to serve as cutting blades capable of being used to cut the plastic sheet.

Use of this invention is made by securing a pair of the clips to the upper portion of the interior side walls of a truck at a position near the rear door opening. A sheet of plastic is hung from these clips and is secured at the bottom by the closing and latching of the truck's door. The hanging is effectuated by tying a knot in the two upper corners of the sheet plastic and inserting the knot into the V-shaped notch of the clip of this invention. The sheet is thereby secured in its desired position. When the cargo needs to be unloaded the sheet can quickly be removed by just tugging downwardly on the sheet. The sharp edges of the V-shaped notch cut through the plastic and allow the sheet to be torn away, leaving the knot in the retainer and from which it may be readily removed prior to attaching another sheet of plastic thereto.

The primary objectives of this invention are to provide an effective means of support for a plastic sheet for use in forming a water impervious seal for the use in the cargo compartment of a truck having a rear door opening therefor. Important aspects of this objective are that the support structure is economical to manufacture and install, extremely effective in its designed use, and easy to use.

Another objective of this invention is to provide a plastic sheet support clip that assists in removal of the plastic sheet when the truck reaches its destination and is to be unloaded. This important objective is furthered by the sharp edges on the lower portion of the V-shaped notch in the front wall.

These and other objects and advantages of this invention will be readily apparent from the following detailed description of an illustrative embodiment thereof. Reference will be had to the accompanying drawings which illustrate the embodiment of the invention.

DESCRIPTION OF THE DRAWING FIGURES

FIG. 3 is a vertical sectional view taken along line 3—3 of FIG. 2.

FIG. 4 is a fragmentary horizontal sectional view on a substantially enlarged scale taken along line 4—4 of FIG. 3.

FIG. 5 is an end elevational view of a truck body provided with clips and supporting a plastic sheet.

DESCRIPTION OF THE ILLUSTRATIVE EMBODIMENT

Figure 1:
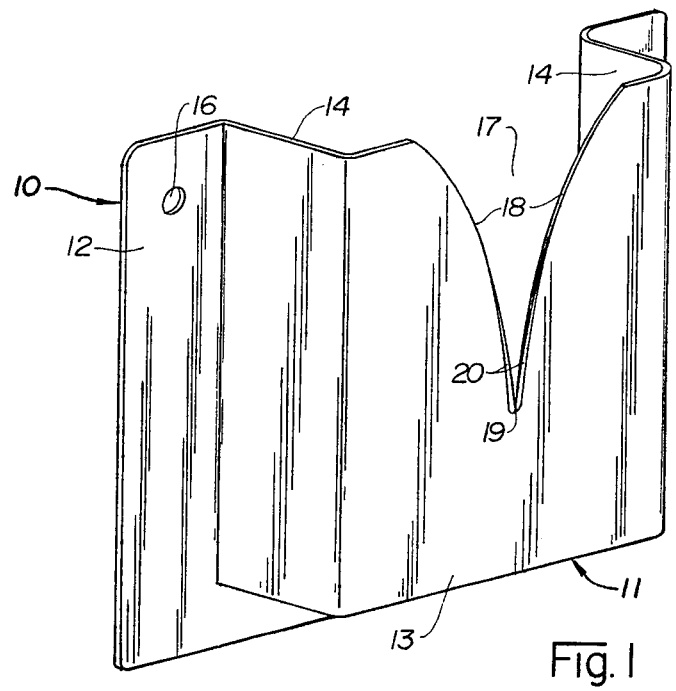
FIG. 1 is a front perspective view of a plastic sheet support clip embodying this invention.
Figure 2:
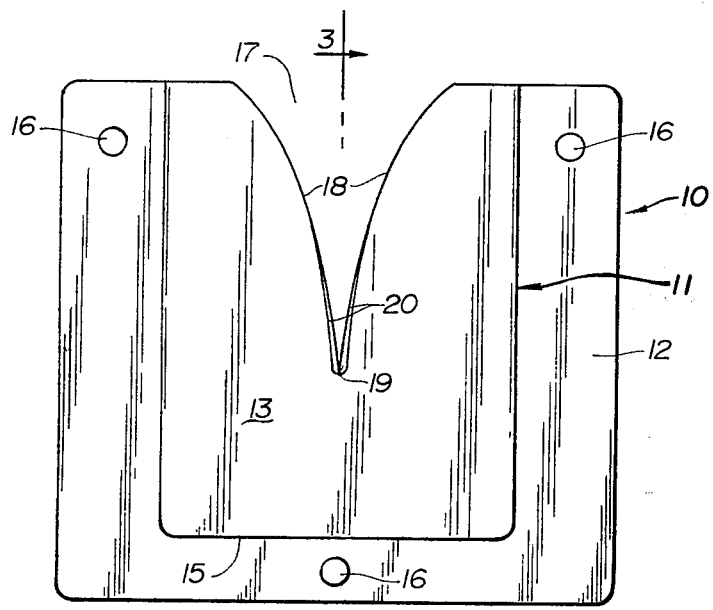
FIG. 2 is a front elevational view thereof.

Having reference to the drawings attention is directed first to FIG. 1 which illustrates a plastic sheet support clip structure embodying this invention and designated generally by the numeral 10. A pair of these clips are intended to be installed on opposite sidewalls in the upper rear corners of the cargo compartment of a truck T as is diagramatically shown in FIG. 5. This end of the truck is provided with a door opening and a suitable door assembly but which door is not shown. Installation is accomplished by use of appropriate fastening devices such as screws or rivets depending on whether the sidewall surface is wood or metal. A sheet of plastic P is then suspended across the open end of the truck T by having the opposite upper corners thereof knotted and inserted into the respective support clips 10. The bottom edge of the plastic sheet P is clamped to the floor of the trucks cargo compartment by the door and the vertical side edges of the sheet are then disposed closely adjacent the side walls of the truck.

The plastic sheet support clip 10 of this invention is formed from a single piece of sheet metal such as aluminum or steel having a thickness of 16 or 14 gauge(B & S). A flat strip of a selected sheet metal is readily fabricated into the desired clip configuration of this invention by a die stamping operation. The stamping operation causes the flat metal sheet to be stretched in certain regions thus forming the specifically configured clip illustrated in the drawings. From a dimensional standpoint, the clip measures approximately 2½" in width and about two inches in height and has a depth of approximately ⅝".

FIGS. 1-4 illustrate the constructional configuration of the support clip 10 which can be generally described as having a plastic sheet retainer 11 of channel form and a peripheral mounting flange 12. The retainer 11 is formed with a front wall 13 and opposed vertically extending side walls 14 at each side thereof. A bottom wall 15 is also provided and interconnect with the front and side walls 13, 14 at their lower ends. The retainer 11 thus has an open top, closed bottom channel configuration. Formed with the side and bottom walls 14 and 15 at their edges remote to the front wall 13 is the mounting flange 12 which is about ⅜ inches wide. This mounting flange thus extends around three sides of the clip in parallel relationship to the front wall 13 and has a plurality of apertures 16 formed therein through which appropriate fastening devices may be projected in attaching the clip to a vertical surface of a truck body.

Three such apertures 16 are provided in the illustrative embodiment of the clip with two apertures being formed in the upper ends of the vertically extending portions of the flange and the third aperture is formed in the flange section underlying the bottom of the retainer 11.

A V-shaped notch 17 is formed in the front wall 13 of the retainer to provide a means of securely engaging a knotted corner of a plastic sheet. This notch 17 opens at the top edge of the front wall 13 with the opposite side edges 18 converging in a downward direction and terminating at a vertex 19. Dimensionally, the notch is about ¾ inch wide at its open end and has a depth of about one inch. In the illustrative embodiment, it will be noted that the side edges 18 are formed with a slightly convex curvature with the corners at their juncture with the top edge of the wall being smoothly rounded to prevent injury and avoid tearing of the plastic sheet which is relatively thin. The convex curvature of the edges results in a better wedging action with respect to the plastic sheet than could be achieved with a straight edged V-shaped notch.

Although the clip is formed from a relatively thin sheet metal and the edges 18 of the notch are thus relatively narrow, it is preferred that at least those portions of the edges adjacent the vertex 19 be further reduced in width and effectively form a sharpened edge 20. These sharpened edge portions are more clearly seen in FIG. 4 which is a substantially enlarged sectional view. The function of these sharpened edges is to facilitate removal of a plastic sheet from a clip as will be further explained. These edges are not knife-sharp so that the likelihood of physical injury will be minimized and the plastic sheet will not be cut or torn as a consequence of its own weight.

This support clip 10 when once attached to the side wall of a truck is utilized in the following manner to support a plastic sheet in forming a water impervious seal or barrier shield across the rear of the truck body. First, knots are tied at the two upper corners of the plastic sheet. Then each knotted corner is stuffed into its respective corner's plastic sheet support clip. The sheet is given a gentle tug to pull the sheet downwardly into the notch 17. The knot being larger than the width of the notch thus prevents it from being pulled through thereby securely supporting the plastic. The sheet is then properly supported in suspended relationship to the truck body as shown in FIG. 5, without the necessity of relying on countless staples and numerous pieces of tape to do the job. When it becomes necessary to remove the plastic sheet, a strong tug on the plastic sheet will cause the sharpened edge portions 20 to sever the sheet, leaving the knot in the retainer 11. When another sheet of plastic is to be suspended from the clips, the knots left in the clips may be easily removed and then discarded.

It will be readily apparent from the foregoing detailed description of illustrative embodiments of this invention, that a particularly novel and extremely effective plastic sheet support clip structure is provided. This plastic sheet support clip is relatively simple to fabricate and requires a minimal amount of time for installation in the cargo compartments of trucks. The structure utilizing a stamped piece of sheet metal as the basic structural element thereof, is economical to fabricate and results in aiding in the forming of an effective water seal as to the rear door opening and door assembly of a truck. The permanent nature of the invention permits its use an unlimited number of times, unlike staples or tape which need to be replaced for each loading. The specific configuration of the support clip with its V-shaped notch and mounting flange results in a device extremely useful to truckers in helping to reduce water damage from water seeping into the cargo area by way of the rear door in trucks having a door which does not form an adequate water impervious seal or barrier.

Having thus described the invention, what is claimed is:

1. A plastic sheet support clip comprising an open-topped, channel-form retainer and a mounting flange that is connected with said retainer in structurally rigid relationship, said channel-form retainer having a relatively thin front wall provided with a V-shaped notch opening at the top of the retainer for receiving a gathered-together marginal edge portion of a plastic sheet therein and initially retaining such plastic sheet in suspended relationship, said notch having the side edges thereof inwardly convergent toward the lower closed end to sufficiently decrease the spacing therebetween so as to enable the side edges to perform severing of a plastic sheet when such sheet is pulled toward the notch's vertex by a force substantially greater than the suspended weight of such plastic sheet.

2. A support clip according to claim 1 wherein said channel-form retainer is formed with vertically extending sidewalls at each side of said front wall and said mounting flange is formed with said side walls in spaced relationship to said front wall and projecting laterally outward with respect to said sidewalls.

3. A support clip according to claim 2 wherein said retainer is formed with a bottom wall.

4. A support clip according to claim 3 wherein said sidewalls and bottom wall are disposed in perpendicular relationship to said front wall.

5. A support clip according to claim 3 wherein said mounting flange includes a portion formed with said bottom wall and projecting laterally downward with respect thereto.

6. A support clip according to claim 1 wherein said retainer and mounting flange are integrally formed.

7. A support clip according to claim 1 wherein the portions of said notch side edges next adjacent the vertex thereof are relatively sharpened for a predetermined length to enhance the ability of said side edges to sever a plastic sheet pulled toward the vertex of the notch.

8. A support clip according to claim 1 wherein said V-shaped notch has side edges which are convexly curved.

* * * * *